March 2, 1943.  H. E. ALTGELT  2,312,616
TRACTOR PLOW
Original Filed Aug. 19, 1939  5 Sheets-Sheet 1
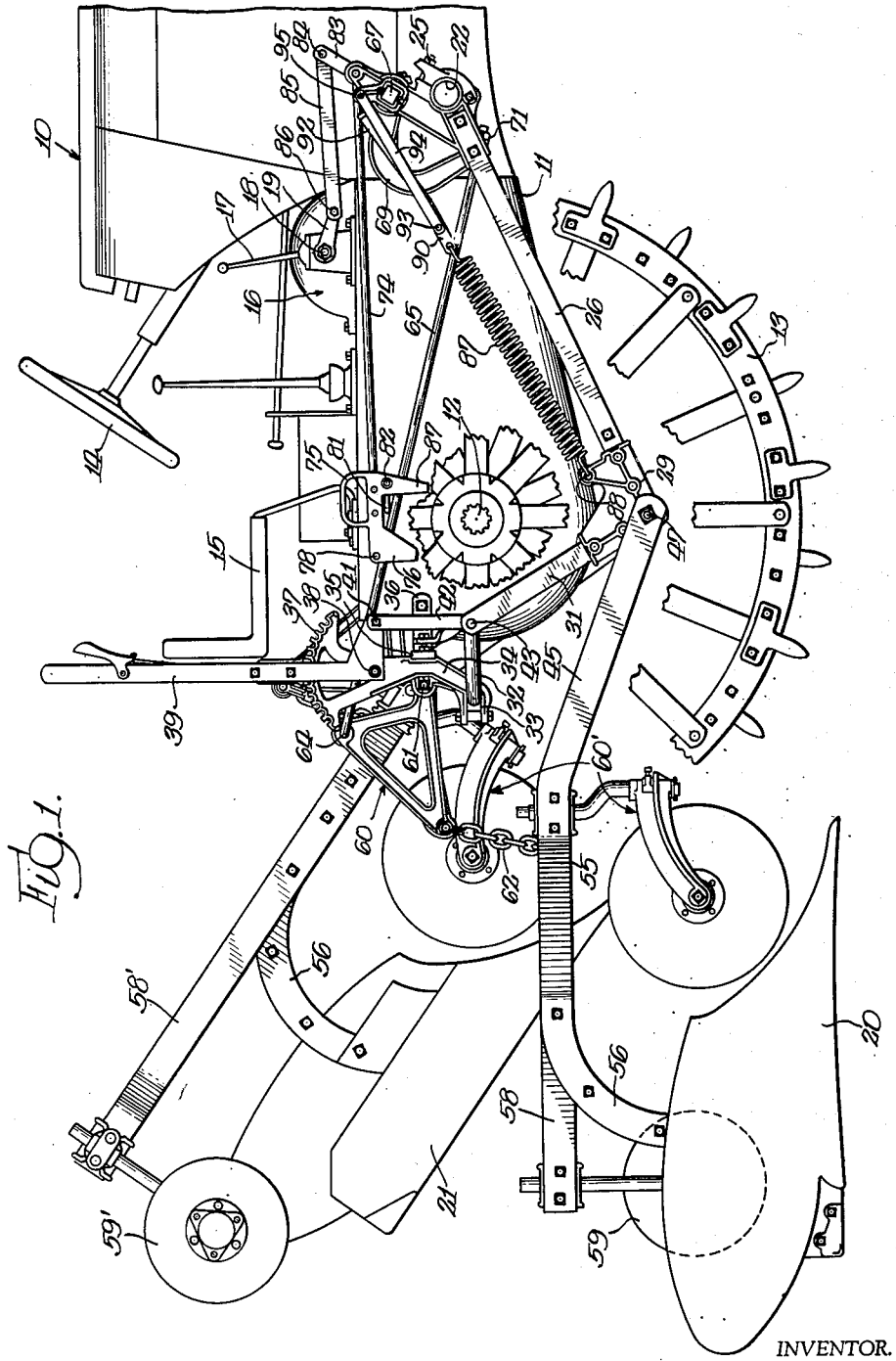
INVENTOR.
Herman E. Altgelt,
BY John P. Smith
ATTORNEY.

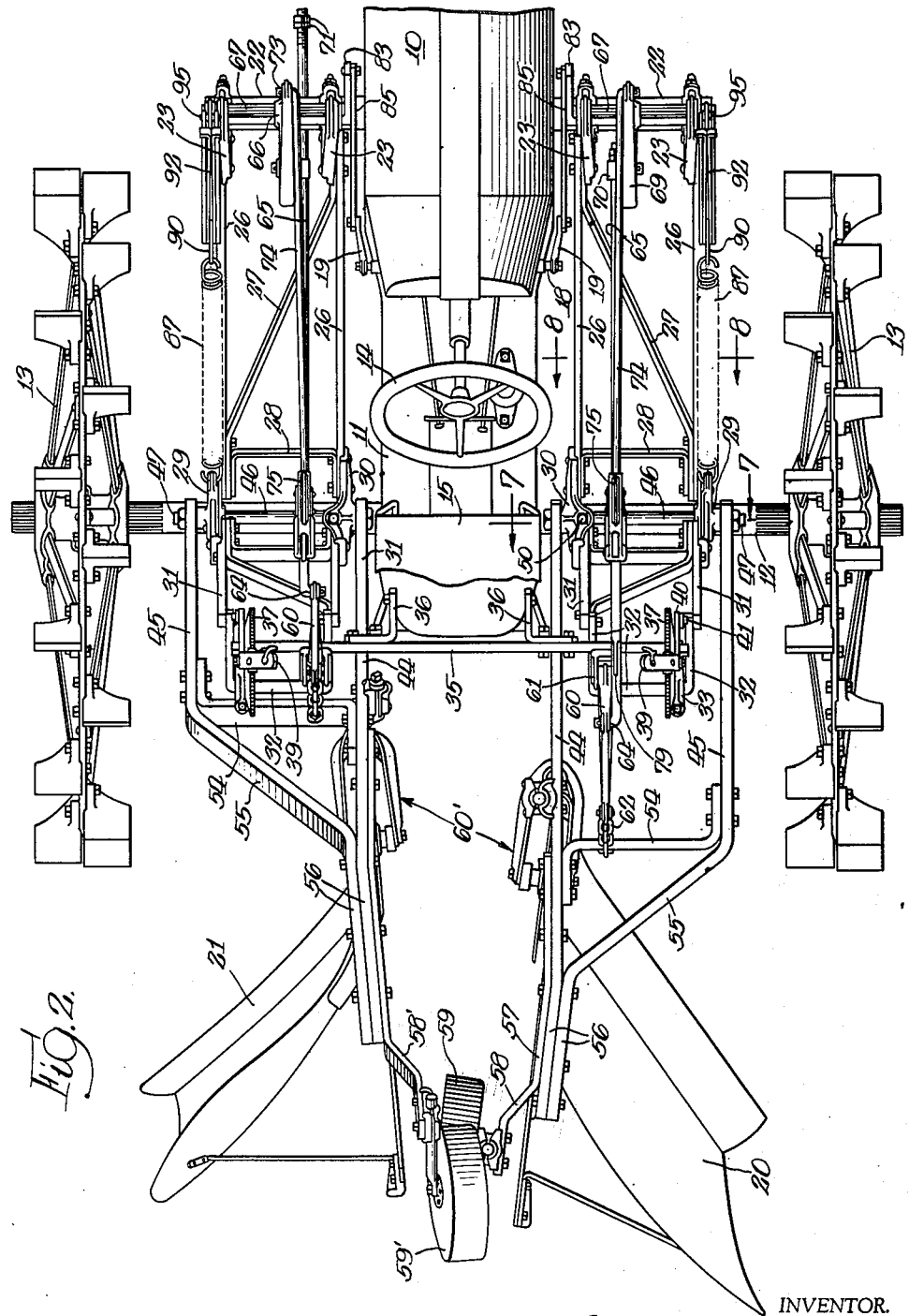

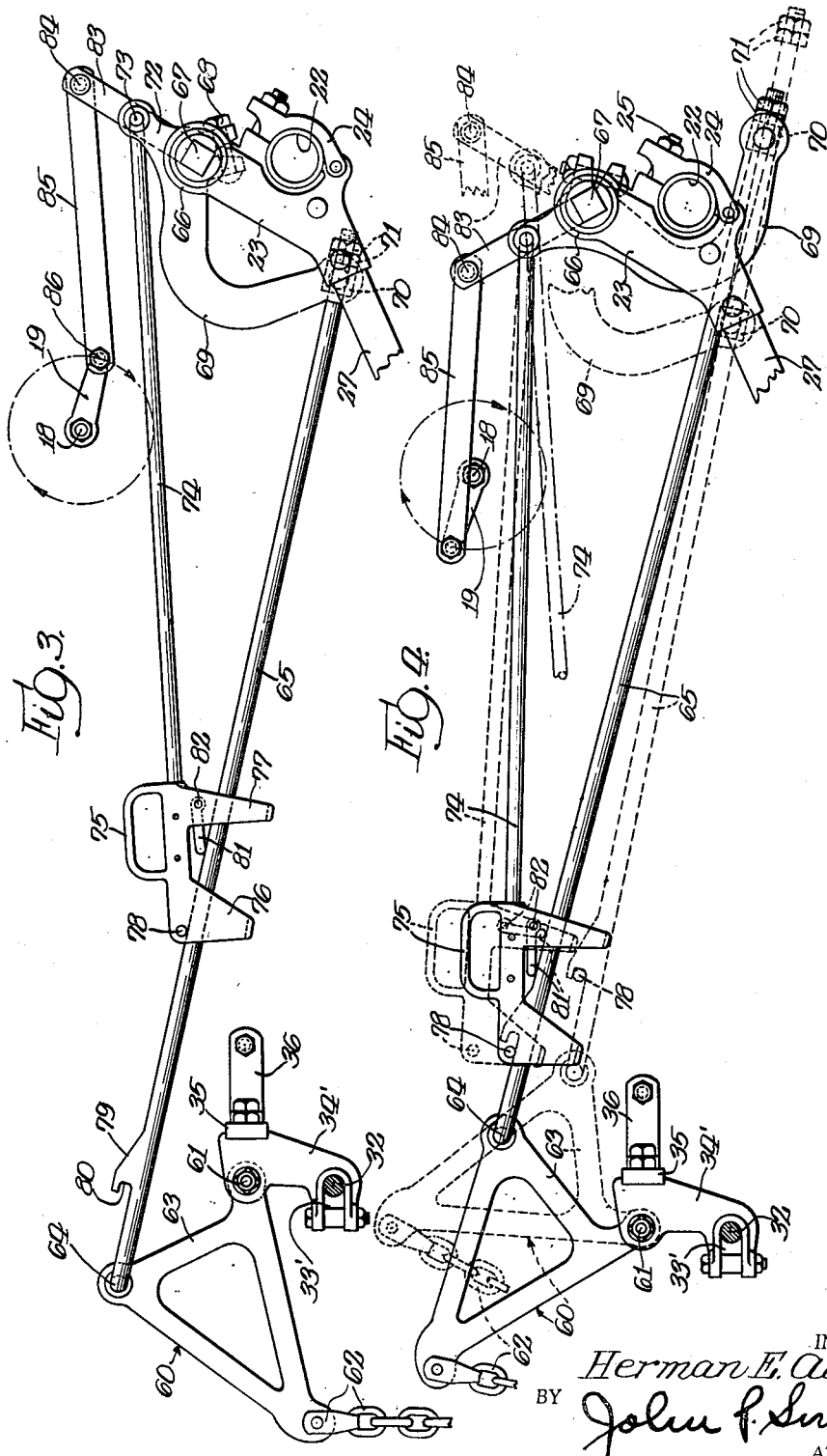

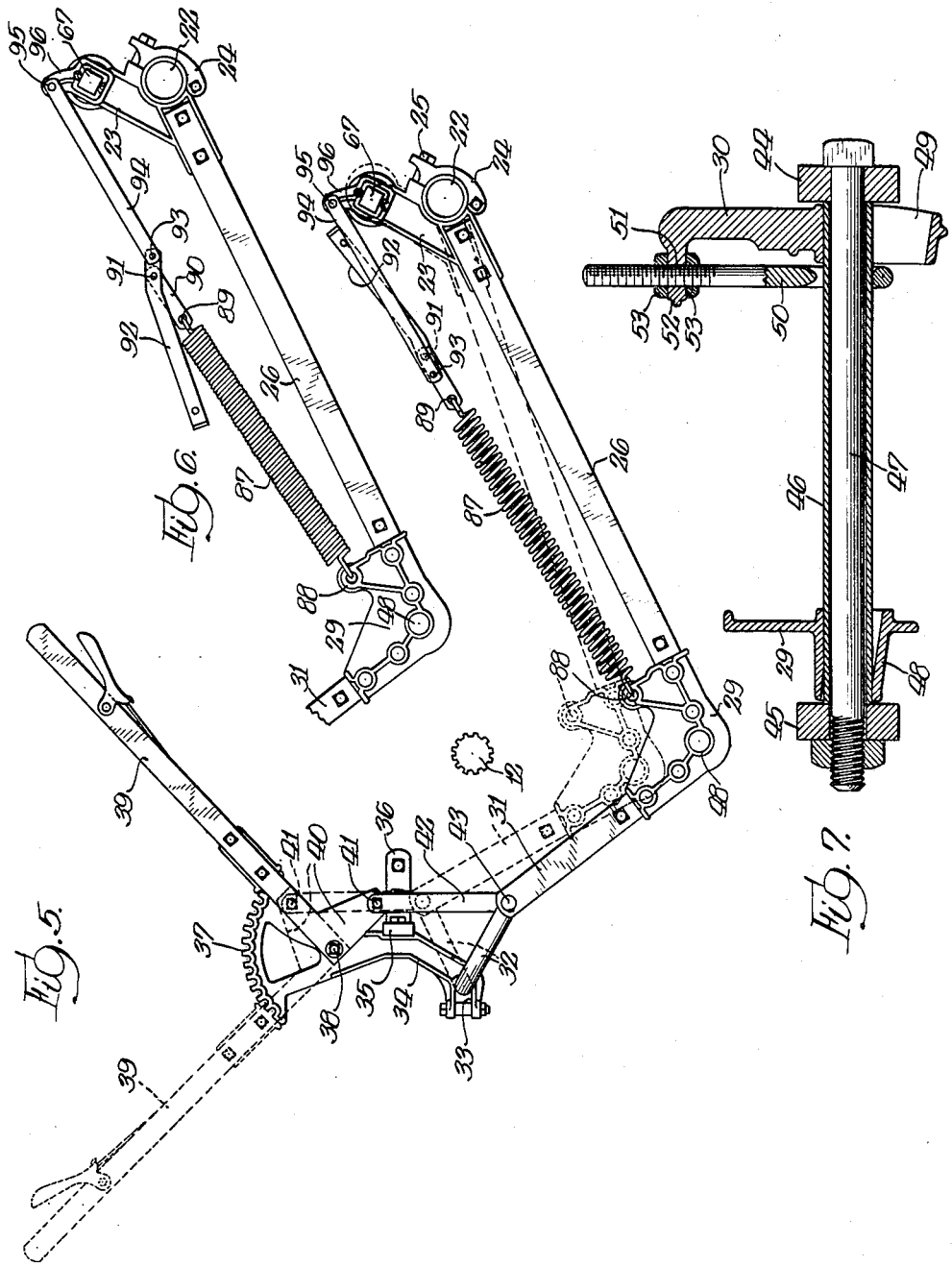

March 2, 1943.  H. E. ALTGELT  2,312,616
TRACTOR PLOW
Original Filed Aug. 19, 1939  5 Sheets-Sheet 5
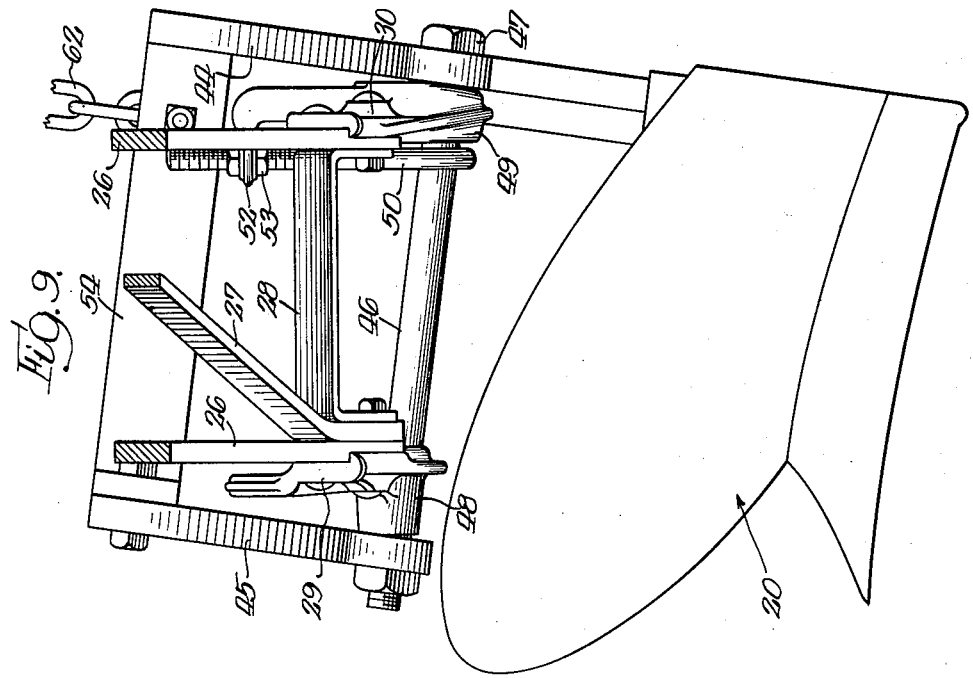
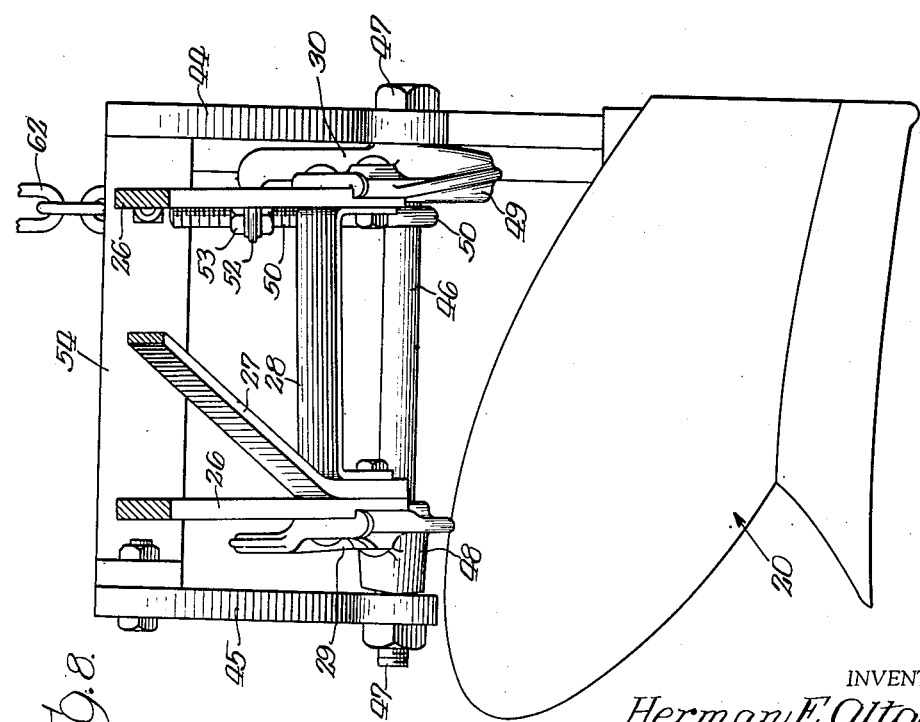
INVENTOR.
Herman E. Altgelt,
BY John P. Smith
ATTORNEY.

Patented Mar. 2, 1943

2,312,616

UNITED STATES PATENT OFFICE 2,312,616

TRACTOR PLOW

Herman E. Altgelt, South Bend, Ind., assignor to Oliver Farm Equipment Company, a corporation of Delaware Substituted for abandoned application Serial No. 291,016, August 19, 1939. This application July 26, 1940, Serial No. 347,782

19 Claims. (Cl. 97—50)

The present invention relates generally to plows, but more particularly to a new and improved construction of a two-way tractor sulky plow, and this application is a substitute for my application, Serial Number 291,016, filed August 19, 1939, for Tractor plow.

The two-way plow of the present type is usually provided with two bases—one right hand base and one left hand base. When plowing, only one of these bases is in the ground, while the other base is elevated to inoperative or raised position. The purpose of this type of plow is to avoid having "dead furrows" or ditches and back furrows or ridges in the plowed field. This is accomplished by plowing with the right hand base in one direction and with the left hand base in the opposite direction so that the furrows made by each of the right and left hand plow bases are in successive adjacent positions. These types of two-way plows are commonly used in irrigated fields where "dead furrows" and back furrows are objectionable in that they interfere with the desired even flow of water over the plowed field.

The primary object of the present invention is to provide a novel and improved two way plow construction which is adapted to be mounted on and supported by a tractor in such a way that the conventional power lift of the tractor may be automatically employed to raise the right hand plow base to inoperative position while lowering the left hand plow base to ground engaging position or vice versa.

A further object of the invention is to provide a novel and improved construction of two way sulky plow mounted on and supported by a tractor in which the conventional power lift mechanism may be employed for lifting both plows and maintaining them simultaneously in elevated position for turning at the ends of the field or for transporting the entire two way plow from or to the field.

A still further object of the invention is to provide a novel and improved two way plow in which the conventional power lift mechanism of the tractor may be employed to lower one of the bases into the ground and automatically and simultaneously raise the inoperative base to a higher elevation from the ground during the plowing operation.

A still further object of the invention is to provide a novel and improved two way plow construction which is adapted to be mounted on and supported by the tractor and in which the bases are set at an angle with respect to the longitudinal center of the tractor so that the rearward end of the landside is much closer to the center line of the tractor than the front end of the landside and point of the share so as to counteract the side draft on the tractor occasioned by the tractor's inclination to the horizontal caused by one of the traction wheels running in the previously plowed furrow.

Another object of the invention is to provide a novel and improved plow structure which is held laterally rigid with respect to the tractor so that the landside thereof acts like the rudder on a boat to cause the tractor to run in a line with the previously made furrow without the necessity of the operator constantly manipulating the steering mechanism in order to keep the steering means from entering the plowed ground.

A still further object of the invention is to provide a novel and improved plow construction which is adapted to be mounted on and actuated by the power lift mechanism of the tractor and arranged so that manual means is provided for adjusting the front end of the beam of the plow to vary the depth penetration of the base into the ground.

Another object of the invention is to provide a novel and improved plow construction in which the plow base may be adjusted with respect to the draft means, so that the base may be revolved about a substantially longitudinal axis in order to make the plow share penetrate the soil by having the forward point of the share run slightly lower than the wing of the share. This adjustment permits leveling of the plow base when the tractor is tilted.

These and other objects are accomplished by providing a construction and an arrangement of the various parts in the manner hereinafter described and particularly pointed out in the appended claims.

Referring to the drawings:

Fig. 1 is a fragmentary side elevational view of the conventional form of tractor showing my improved two-way sulky plow mounted thereon;

Fig. 2 is a top plan view of the device shown in Fig. 1;

Fig. 3 is a fragmentary side elevational view showing the operative connections of the power lift of the tractor when the plow is in its lowest or plowing position;

Fig. 4 is a similar side elevational view in which the operative connection of the power lift shown in full line illustrates the position of the parts as they appear when both plow bases are raised for transportation. The broken line position of the parts shown in this figure indicates the position of the parts when the base is raised to its highest position;

Fig. 5 is a fragmentary side elevational view showing the lever mechanism and associate connections by means of which the front end of the beam may be adjusted;

Fig. 6 is a similar view to that shown in Fig. 5, showing the manner in which the tension on the balancing spring may be released;

Fig. 7 is a cross sectional view taken on the line 7—7 in Fig. 2;

Fig. 8 is a cross sectional view taken on the line 8—8 in Fig. 2; and

Fig. 9 is a similar view to that of Fig. 8 illustrating the manner in which the plow base may be adjusted about a longitudinal axis with respect to the draft frame.

In illustrating one form my invention may assume in practice, I have shown the same in connection with a more or less conventional type of tractor, a fragmentary portion of which is shown in the drawings and generally indicated by the reference character 10. The tractor in this instance comprises a longitudinally extending frame 11, rear axle 12, to the outer ends of which is adjustably secured traction wheels 13. This tractor is also provided with the usual steering wheel mechanism generally indicated by the reference character 14 and operator's seat 15. The tractor in this instance is also provided with the more or less conventional power take off type of half-revolution clutch mechanism which is mounted within the housing generally indicated by the reference character 16. This power take-off mechanism is operatively driven by the transmission mechanism of the tractor and is preferably of the form described and illustrated in the patent to H. E. Altgelt, No. 2,059,676 issued November 3, 1936. This clutch mechanism, actuated by the engine of the tractor, is controllable from the operator's seat of the tractor by a trip lever 17. The half revolution clutch mechanism includes a transverse shaft 18 to the opposite ends of which are rigidly secured cranks 19.

The operative parts of my improved two-way plow construction includes substantially similar parts except that one of the plows as indicated at 20 is a right hand plow and the other plow as indicated at 21 is a left hand plow. Therefore, in order to avoid repetition of description, it will be understood that the description and operation of the operative parts on one side of the tractor will suffice for the description of similar parts on the other side of the tractor.

Secured to the tractor frame and extending transversely with respect thereto at a point forward of the rear axle 12 is a supporting beam or pipe 22. The plow attachment in this instance includes a laterally rigid though pivoted draft section and a plow section. The draft section comprises brackets 23 which are oscillatably mounted at spaced apart distances adjacent the inner and outer ends of the pipe or support 22. These brackets 23 are detachably secured by pivoted clamping brackets 24 and bolts 25. Secured to rearwardly and downwardly extending sockets in each of the brackets 23 are longitudinally extending draft bars 26. Extending diagonally across the bars 26 is a reinforcing brace member 27. The rear ends of the draft bars 26 are connected to the transverse U-shaped brace 28. Rigidly secured to the outermost bar is a substantially L-shaped bracket 29. Secured to the rear end of the inner bar 26 opposite the bracket 29 is a second L-shaped bracket 30. Secured in upwardly extending sockets in each of the brackets 29 and 30 are upwardly inclined bars 31. The bars 31 are reinforced by a diagonal brace. These draft bars 26 and associated parts constitute rigid draft sections of the plow attachments. Pivotally connected to the upper ends of each of the bars 31 is a substantially U-shaped bail 32 which in turn is journaled in longitudinally extending and spaced apart slots 33 and 33' in respective spaced apart brackets 34 and 34'. The brackets 34 and 34' are secured to a transverse frame member 35 which in turn is secured to the tractor by angle members 36 adjacent the opposite sides of the frame of the tractor. (See Figs. 1, 3, 4 and 5.) Formed integrally with the bracket 34 is a lever sector 37. Pivoted to the lever sector 37 as shown at 38 is a lever 39. The lever 39 is provided with the usual detent mechanism for locking the lever in various positions of adjustment. Extending at right angles from the lower end of the lever adjacent the pivot 38 is an arm 40. Pivotally connected as shown at 41 to the outer or free end of the arm 40 is a link 42. The lower end of the link 42 is pivotally connected as shown at 43 to the outside bar 31. This pivot 43 is also the common pivot for the upper end of the bar 31 and one of the arms of the U-shaped bail 32. This adjusting mechanism permits the forward end of the beam of the plow to be adjusted for regulating the depth penetration of the plow in the manner hereinafter more fully described.

In order to compensate for the inclination of the tractor occasioned by one of the traction wheels traveling in the previously ploughed furrow and in order to secure efficient plowing at a proper penetration of the soil, the forward point of the share must, of necessity, run slightly lower than the wing of the share. In order to secure these advantages, I have provided a novel construction which permits the plow base or plow section to be adjusted about a substantially longitudinally and horizontally extending axis with respect to the tractor, particularly at that point where the forward end of the beam or plow section attaches itself to the supplemental draft section attached to the tractor. This novel feature includes two longitudinally extending and horizontally spaced apart plow beam members 44 and 45 which have their forward ends held in rigid spaced apart relationship by a spacer tube or pipe 46 and a transverse bolt 47. (See Figs. 7, 8 and 9.) The pipe and bolt at their outer ends project through a bearing sleeve 48 which is formed integrally with the L-shaped bracket 29. The internal transverse bore in this bearing sleeve 48 is of a vertically slotted construction as to permit the other end of the pipe and bolt to move vertically therein for revolving the plow base on substantially a longitudinal horizontal axis with respect to the draft section or tractor frame. The inner end of the pipe 46 and bolt 47 extend through a vertically slotted aperture 49 formed in the inner L-shaped bracket 30. (See Figs. 7, 8 and 9.) The pipe 46 and bolt 47 which form the axis for the forward end of the plow beam is adjustable in the vertical slot 49 of the bracket 30 by an eye bolt 50 through the eye of which the inner end of the pipe and bolt 46 and 47 respectively extend and the upper end of which is adjustably mounted in an aperture 51 formed in an outwardly projecting flange 52 of the bracket 30. This eye bolt 50 is adjustable in this bracket by threaded nuts 53 mounted in threaded engagement with the threaded portion of the eye bolt on the opposite sides of the projecting flange 52.

Obviously from the above description it will be seen that should adjustment be required to level the plow in order to compensate for the inclination assumed by the tractor by reason of one of the traction wheels running in a previously plowed furrow, adjustment of the nuts 53 vertically to revolve the plow base about a substantially longitudinally and horizontal axis with respect to the draft section or frame of the tractor may be accomplished.

The intermediate ends of the plow beam members 44 and 45 are reinforced by transverse brace bar 54. The beam member 45 is disposed angularly inwardly as shown at 55 with the rearmost ends of the beams 44 and 45 secured in contacting relation. These portions of the beams are curved downwardly and bolted to the inner surface of the landside of the plow base 20. With the present and conventional type of tractor mounted two way plows, it becomes necessary to off-set or place one plow on each side of the longitudinal center line of the tractor. Furthermore, in plowing, the tractor inclines to the furrow side because one of the traction wheels of the tractor runs in the previously plowed furrow and therefore assumes a lower level than the traction wheel on the unplowed land. These factors add to the side draft of the tractor and with plows heretofore employed having their landsides parallel with the longitudinal center line of the tractor, the front steering wheel (or dual wheels) of the tractor has a tendency to lead to or enter the previously made furrow the moment the operator releases his hands from the steering wheel of the tractor.

In order to counteract this side draft on the tractor and overcome the tendency of the steering wheels of the tractor to enter the previously plowed furrow, I have set the plow bases and their respective landsides at an angle with respect to the longitudinal center line of the tractor, so that the rear of the landside is much closer to the longitudinal center line of the tractor than the front end of the landside. This can be readily observed by examining Fig. 2 of the drawings. The landsides used in this instance are relatively higher and longer than is customary on conventional plows which are drawn from the drawbar of the tractor.

The plows in the present instance are held rigidly laterally with respect to the tractor and the angularly disposed landside of the plow acts like a rudder on a boat to overcome the side draft on the tractor and therefore cause the tractor to run in a line with the previously plowed furrow without the necessity of the operator constantly manipulating the steering mechanism.

Secured to the inner surface adjacent the rear end of the beam bar 44 is a frame member 57 which has its rear end inwardly offset as shown at 58. Adjustably secured to the rear end of the offset portion 58 is a gauge wheel generally indicated by the reference character 59. Arranged forwardly of the plow base 20 and secured to the plow beam 44 is a disc or coulter generally indicated by the reference character 60'.

The only difference between the structures of the right and left hand plows 20 and 21 respectively, outside of the fact that one is a right hand and the other is a left hand plow is that the gauge wheel 59' is mounted on the longer or extended bar 58' so that when one of the plows is being raised while the other is being simultaneously lowered, there will be sufficient clearance for these gauge wheels to pass one another inasmuch as they substantially trail in the longitudinal center of the tractor. Outside of these exceptions and the fact that certain of the parts are right and left handed, their function and manipulation is essentially identical.

The mechanism by means of which the conventional power lift mechanism of the tractor is employed to simultaneously raise one plow while lowering the other plow of a two way tractor plow, or to raise both plows for transport purposes, or to raise the inoperative plow higher than normal transport position while the other plow is being lowered to plowing or operative position, will next be described.

This mechanism includes a bell crank for each of the plows and generally indicated by the reference character 60. This bell crank 60 is pivoted at 61 to the bracket 34'. (See Figs. 3 and 4.) The rearwardly projecting arm of the bell crank 60 is connected by means of a chain as shown at 62 to the transverse frame member 54 of the plow beams 45 and 44. The upper projecting arm 63 of the bell crank 60 is pivotally connected as shown at 64 to a connecting rod 65. Formed integrally with each of the bearing brackets 23 and extending directly above the pipe or support 22 is a supplemental bearing portion 66 in which is journaled a rock shaft 67. Secured to the rock shaft 67 by means of a clamping bolt 68 is a downwardly curved goosenecked crank member 69. Pivoted to the free end of the goosenecked crank member 69 is a buckle or swivel member 70 which has a longitudinally extending bore through which the forward end of the connecting rod 65 is adapted to slide. Mounted on the forward threaded end of the rod 65 are adjustable nuts 71. Obviously with this construction the rod 65 has a lost motion connection with the crank when the rod 65 is actuated forwardly with respect to the crank 69. Formed integrally with the crank 69 and extending substantially in the opposite direction thereof above the rock shaft 67 is an arm 72. Pivotally connected to the outer or free end of the arm 72 as shown at 73 is a rod 74. Secured to the rearward end of the rod 74 is a hand grip 75. This hand grip 75 has rearward and forward spaced apart walls 76 and 77, both of which completely embrace the rod 65 so as to form a guide for the rearward end of the rod 74. Extending between the rear spaced apart walls 76 is a transverse pin 78 which is adapted to ride over an inclined portion 79 of a hook 80 formed integrally with the rod 65. From the above description it will be obvious that when the pin 78 of the rod 74 engages the hook 80 of the rod 65 that an actuation of the rock shaft 67 in a clockwise direction as viewed in Fig. 4 will cause the bell crank 60 to be actuated forwardly from its full-line position to its broken line position shown in this figure to further elevate the plow from its normal elevated or transporting position. In order to unlock the pin 78 from the hook 80 I have provided a gravity actuated pendulum 81 which is pivoted at 82 between the two forward walls 77 of the hand grip 75. This pendulum or pawl assumes a perpendicular position when the hand grip is raised to the broken line position shown in Fig. 4 of the drawings. When in this position the lower end of the pendulum rests on the rod 65 and holds the pin 78 elevated above the hook 80 so that upon a forward movement of the rod 74 by the actuation of the power crank 19 the pin 78 will be carried forwardly over and passed the hook 80 so that the actuation of the crank 69 through the rod 65 becomes effective to lower the plow base. Rigidly secured to the inner end of the rock shaft 67 is an upwardly projecting arm 83. Pivotally connected to the upper end of the arm 83 as shown at 84 is a link 85 which has its rear end pivotally connected as shown at 86 to the power crank 19 of the half revolution power take-off mechanism hereinbefore described.

In order to assist the manual adjustment of the front end of the plow beam, I have provided balancing springs generally indicated by the reference character 87 which have their rearward ends connected as shown at 88 to ears formed on the L shaped brackets 29. The forward end of the spring in each case is connected as shown at 89 to a link 90. The other end of the link 90 is pivotally connected as shown at 91 to a lever 92. The lever 92 is pivotally connected as shown at 93 to a link 94. The upper forward end of the link 94 is pivotally connected as shown at 95 to an upwardly extending arm 96. The arm 96 is rigidly secured to the crank shaft 67 adjacent the outer end thereof.

From the above description it will be seen that the lever 92 has its intermediate portion offset so that, upon the actuation of the lever from the position shown in Fig. 6 to the position shown in Fig. 5 of the drawings, the spring will be extended and by reason of the location of the pivotal centers will cause the lever to lock when tension is placed upon the spring. This simple arrangement of toggle link connection simplifies the connection of and expedites the placing of the balancing spring under tension by the simple operation of manipulating the lever.

Summarizing the advantages and methods of operation of my invention, let us assume that both of the plow bases the right and left hand respectively, 20 and 21, are raised to their normal inoperative position for transporting or for turning at the end of the furrow. When both plows are raised to their normal transporting position, the two bell cranks 60, the connecting rod 65, the cranks 69 as well as the connections 85 to the power crank 19 are in the full line position shown in Fig. 4. Should the operator be desirous of lowering one of the plows, the hand grip 75 is raised so that the pendulum 81 hangs perpendicularly downwardly and rests on the upper edge of the rod 65 in the position shown in broken lines in Fig. 4 of the drawings. When this has been done the half revolution power take-off trip lever 17 is then tripped so that the crank 19 is actuated through an arc of 180° or to the full line position shown in Fig. 3. In this latter position it will be observed that the rock shaft 67 is revolved in a clockwise direction bringing the crank 69 rearwardly and with it the rod 65 rearwardly lowering the bell crank 60 and with it the chain 62 connected to the plow beam, thereby lowering the particular plow base into engagement with the ground. While the lowering operation is taking place on one side of the tractor, the normally elevated plow on the other side of the tractor is being further raised so as to give further clearance between the ground and the raised plow. This is essential because one of the tractor wheels of the tractor is running in the previously plowed furrow and therefore lowers the whole frame of the tractor with respect to the ground. In this connection it will be observed by examining Fig. 4 of the drawings that as the crank 19 is moved through an arc of 180° the arms 83 and 72 are actuated to the broken line position shown in Fig. 4 and by reason of the pin 78 engaging the hook 80 of the rod 65 the bell crank of the normally elevated plow base is raised from the full line position to the broken line position shown in Fig. 4 to further elevate the normally elevated plow base.

With the operative parts in the position above described, i. e., one plow base in ground engaging position and the other plow base raised above its normal transporting position, should the operator desire to raise the plow base out of ground engaging position, the power lift clutch trip member 17 is tripped and by actuation of the crank from the full lined position shown in Fig. 3 to the full line position shown in Fig. 4, the previously lowered plow base is raised to normal transport position, while the other elevated plow is lowered from its maximum elevated position or the broken line position shown in Fig. 4 to its normal transport position shown in the full line in this figure. In this connection it will be noted that the pin 78 on the hand grip 75 and its cooperating hook 80 on the rod 65 are slightly separated when the plow or plows are in their normal transporting position, thus making it possible to raise the grip 75 and supporting the same on the pendulum 81 to prevent engagement of the pin 78 with the hook 80 whenever the operator desires to lower the plow. In this connection it will also be noted that when the elevated plow is lifted to its maximum elevated position, the pin 78 engages the hook 80 and cannot be lifted out of such engagement until the power crank returns the plow to its normal transporting position. It will also be noted that when the hand grip 75 is lifted, the pendulum 81 assumes a perpendicular position which position is maintained only temporarily as the pendulum 81 automatically assumes a horizontal position as soon as the power actuated mechanism actuates the rod 65.

As previously pointed out, the depth penetration of the plow bases may be regulated by the adjusting lever 39 which in turn through the operating connecting links 42, adjust the draft frame members 26 for deep or shallow plowing. In this connection it will be noted that the draft section members 26 and bars 31 form in effect a rigid draft frame and the slotted portions 33 and 33' in the brackets 34 and 34' respectively permits pivoted portion of the bail 32 to slide longitudinally in order to compensate for the rigidity in the frame section.

As previously pointed out, means are provided for adjusting the plow bases and frames on a longitudinally extending axis so as to compensate for and effect a leveling of the base when the tractor is tilted from the horizontal by reason of one of the wheels running in the previously plowed furrow. In this connection it will also be noted that by angularly disposing the landside of each of the plow bases at an angle with respect to a longitudinal line of the tractor, the base or landside serves as a rudder in steering the tractor, relieving the operator of the burden of constantly manipulating the steering mechanism in order to maintain the tractor in alignment with the previously plowed furrow.

While in the above specification I have described one embodiment which my invention may assume in practice, it will of course be understood that the same is capable of modification and that modification may be made without departing from the spirit and scope of the invention as expressed in the following claims:

What I claim is my invention and desire to secure by Letters Patent:

1. A tractor plow in combination with a tractor comprising a draft section pivoted to said tractor, a plow section pivoted to said draft section, a plow base carried by said plow section, a transverse pin forming the connection between said sections, and means for adjusting said plow section on substantially a longitudinal and horizontal axis with respect to said draft section.

2. A tractor plow in combination with a tractor comprising a draft section pivoted to said tractor, a plow section pivoted to said draft section, a plow base carried by said plow section, a transverse pin forming the connection between said sections, means for adjusting said draft section for regulating the depth penetration of said plow base, and means for raising and lowering one end of said pin for adjusting said plow section on substantially a longitudinal and horizontal axis with respect to said draft section.

3. A tractor plow in combination with a tractor comprising a draft section pivoted to said tractor, a plow section pivoted to said draft section, a plow base carried by said plow section, manually adjustable means mounted on said tractor and operatively connected to the pivot of said plow section and said draft section for regulating the depth penetration of said base, and means for adjusting said plow section with respect to said draft section on substantially a longitudinal and horizontal axis for leveling said base with respect to the ground when one of the traction wheels of said tractor enters a previously plowed furrow.

4. A tractor plow in combination with a tractor comprising a draft section pivoted to said tractor, a plow section pivoted to said draft section, laterally spaced apart bearings forming the connection between said sections, and means for adjusting one of said bearings with respect to said draft section for leveling said plow base with respect to the ground when said tractor is tilted.

5. The combination with a tractor including a motor, a single half-revolution clutch mechanism mounted on and driven by said motor, plows operatively connected adjacent the opposite sides of said tractor, and operative connections between said plows and clutch mechanism for simultaneously raising one plow while lowering the other.

6. The combination with a tractor including a motor, a clutch shaft mounted on and driven by said motor, plows operatively connected adjacent the opposite sides of said tractor, and operative connections between said clutch shaft and said plows for raising the elevated plow above transporting position simultaneously with the lowering of the other plow to ground engaging position.

7. The combination with a tractor including a motor, a clutch shaft extending transversely with respect to and mounted on said tractor, said clutch shaft driven by said motor, cranks secured to the opposite ends of said clutch shaft and located on the opposite sides of said tractor, and operative connections between said plows and said cranks for simultaneously raising one plow while lowering the other.

8. The combination with a tractor including a motor, a clutch shaft extending transversely with respect to and mounted on said tractor, a single clutch mechanism between said clutch shaft and said motor, cranks secured to the opposite ends of said clutch shaft and located on the opposite sides of said tractor, plows operatively connected to the opposite sides of said tractor, operative connections between each of said plows and the cranks on the respective sides of said tractor for simultaneously raising or lowering both plows, and means carried by said connections for simultaneously raising one plow while lowering the other plow.

9. The combination with a tractor including a motor, a clutch shaft extending transversely with respect to and mounted on said tractor, said clutch shaft driven by said motor, cranks secured to the opposite ends of said clutch shaft and located on the opposite sides of said tractor, plows operatively connected to the opposite sides of said tractor, and operative connections between each of said plows and the cranks on the respective sides of said tractor for raising the elevated plow above transporting position simultaneously with the lowering of the other plow to ground engaging position.

10. The combination with a tractor including a motor, an intermittently actuated half revolution clutch shaft extending transversely with respect to and driven by said motor, cranks secured to the opposite ends of said clutch shaft and located on the opposite sides of said tractor, plows mounted on the opposite sides of said tractor and vertically movable with respect thereto, and operative connections between said cranks and said plows whereby said plows may be raised on either half revolution of the clutch shaft.

11. The combination with a tractor including a motor, an intermittently actuated half revolution clutch shaft extending transversely with respect to and driven by said motor, cranks secured to said shaft and located on the opposite sides of said tractor, plows mounted on the opposite sides of said tractor and vertically movable with respect thereto, a rock shaft mounted on the opposite sides of said tractor, an arm secured to each of said rock shafts, links connecting each of said cranks to each of said arms, oppositely projecting rock shaft cranks secured to each of said rock shafts, bell-cranks pivoted to said tractor and operatively connected to each of the respective plows, links connecting each of said bell-cranks to one crank of each of the respective rock shaft cranks, and a control rod connected to each of the remaining rock shaft cranks and engageable with each of the respective links for rendering the clutch shaft ineffective to lower either plow to ground engaging position.

12. The combination with a tractor including a motor, an intermittently actuated half revolution clutch shaft extending transversely with respect to and driven by said motor, a crank secured to said clutch shaft, a plow mounted on said tractor and movable vertically with respect thereto, a rock shaft mounted on the tractor, an arm secured to said rock shaft, a link connecting said crank with said arm, upwardly and downwardly projecting arms secured to said rock shaft, a bell-crank pivotally related to said tractor, means for connecting said bell-crank to said plow, a link connecting said bell-crank to said downwardly projecting arm, said last named link having a sliding connection with respect to said last named arm, a control rod pivotally connected to said upwardly extending arm, a bracket secured to one end of said control rod and slidably embracing said last named link, and means carried by said bracket and engageable with said last named link for raising said plow to a higher elevation than its normal elevated transporting position.

13. The combination with a tractor including a motor, an intermittently actuated half revolution clutch shaft extending transversely with respect to and driven by said motor, a crank secured to said clutch shaft, a plow mounted on said tractor and movable vertically with respect thereto, a rock shaft mounted on the tractor, an arm secured to said rock shaft, a link connecting said crank with said arm, upwardly and downwardly projecting arms secured to said rock shaft, a bell-crank pivotally related to said tractor, means for connecting said bell-crank to said plow, a link connecting said bell-crank to said downwardly projecting arm, said last named link having a sliding connection with respect to said last named arm, a control rod pivotally connected to said upwardly extending arm, a bracket secured to one end of said control rod and slidably embracing said last named link, means carried by said bracket and engageable with said last named link for raising said plow to a higher elevation than its normal elevated transporting position, and means carried by said bracket and engageable with said last named link for holding said control rod out of locking engagement with said last named link.

14. The combination with a tractor, a draft frame pivoted to said tractor, a plow frame pivoted to said draft frame, a plow base carried by said plow frame, manually adjustable means mounted on said tractor and connected concentrically with the pivotal connections of both of said frames for adjusting the depth penetration of said plow, a balance spring mounted between said draft frame and said tractor, means for placing said spring under tension including an operating lever having one end off-set with respect to the main body portion thereof, a link connecting one end of said spring to said lever, and a second link connecting one end of said lever to said tractor whereby the manipulation of said lever actuates the pivotal connections of said links and lever passed dead center to expand said spring and lock said lever.

15. The combination with a tractor, an agricultural implement pivotally related thereto, a rock shaft associated with the tractor, operating means for actuating said rock shaft, a crank arm secured to the rock shaft, a balancing spring mounted between said implement and said arm, means for placing said spring under tension including an operating lever having one end thereof offset with respect to the main body portion thereof, a link connecting one end of said spring to said lever, and a second link connecting one end of said lever to said arm whereby upon the manipulation of said lever the pivotal connections of said links and lever actuate said pivots over dead center to expand said spring and lock said lever.

16. The combination with a tractor including a motor, a single half-revolution clutch mechanism mounted on and driven by said motor, plows operatively connected adjacent the opposite sides of said tractor, and operative connections between said plows and said clutch mechanism for simultaneously raising all plows or for simultaneously raising one plow while lowering the other plow.

17. The combination with a tractor including a motor, a single half-revolution clutch mechanism mounted on and driven by said motor, plows operatively connected adjacent the opposite sides of said tractor, operative connections between said plows and said clutch mechanism for simultaneously raising one plow while lowering the other, and means for raising and lowering one plow from ground engaging position to transporting position while maintaining the other of said plows out of ground engaging position.

18. The combination with a tractor including a motor, a clutch shaft mounted on and driven by said motor, plows operatively connected adjacent the opposite sides of said tractor, operative connections between said plows and said clutch shaft for raising and lowering said plows, and means located between said clutch shaft and said plows for lowering one plow while raising the other plow.

19. The combination with a tractor including a motor, a half revolution clutch shaft extending transversely with respect to and mounted on said tractor, said clutch shaft driven by said motor, cranks secured to the opposite ends of said clutch shaft and located on the opposite sides of said tractor, plows operatively connected to the opposite sides of said tractor, and operative connections between each of said plows and the cranks on the respective sides of said tractor for raising one of said plows above the transporting position while lowering the other plow to ground engaging position.

HERMAN E. ALTGELT.